(12) United States Patent
Villeda

(10) Patent No.: US 12,477,169 B2
(45) Date of Patent: Nov. 18, 2025

(54) CONTEXTUAL-BASED MOTION CONTROL OF A USER INTERFACE

(71) Applicant: Roku, Inc., San Jose, CA (US)

(72) Inventor: Milton Villeda, Austin, TX (US)

(73) Assignee: Roku, Inc., San Jose, CA (US)

(*) Notice: Subject to any disclaimer, the term of this patent is extended or adjusted under 35 U.S.C. 154(b) by 0 days.

(21) Appl. No.: 18/300,564

(22) Filed: Apr. 14, 2023

(65) Prior Publication Data

US 2024/0348858 A1 Oct. 17, 2024

(51) Int. Cl.
*H04N 21/422* (2011.01)
*H04N 21/41* (2011.01)
*H04N 21/441* (2011.01)
*H04N 21/45* (2011.01)

(52) U.S. Cl.
CPC ... *H04N 21/42222* (2013.01); *H04N 21/4126* (2013.01); *H04N 21/441* (2013.01); *H04N 21/4532* (2013.01)

(58) Field of Classification Search
None
See application file for complete search history.

(56) References Cited

U.S. PATENT DOCUMENTS

| | | | | |
|---|---|---|---|---|
| 2008/0109843 A1* | 5/2008 | Ullah | .................. | H04N 21/812 725/34 |
| 2009/0100474 A1* | 4/2009 | Migos | ................... | G08C 17/00 725/37 |
| 2011/0058107 A1* | 3/2011 | Sun | ....................... | G06F 3/0346 348/734 |
| 2015/0241982 A1* | 8/2015 | Kim | ....................... | G06F 3/038 345/156 |
| 2015/0287411 A1* | 10/2015 | Kojima | .................. | G10L 17/22 704/246 |

* cited by examiner

*Primary Examiner* — Samira Monshi
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for controlling a user interface using motion-based control. An example embodiment operates by detecting a start action that triggers motion sampling from a remote control. In response to detecting the start action, the embodiment receives motion data from the remote control. The embodiment further determines a control context for the user interface. The embodiment then changes a parameter associated with a user interface element in the user interface based on the control context and the motion data. The embodiment then detects a stop action that terminates the motion sampling from the remote control. In response to detecting the stop action, the embodiment applies the changed parameter associated with the user interface element.

23 Claims, 6 Drawing Sheets

CONTEXTUAL-BASED MOTION CONTROL OF A USER INTERFACE

BACKGROUND

Field

This disclosure is generally directed to controlling a user interface (UI), and more particularly to controlling a UI using contextual-based motion control.

Background

Interacting with and controlling a user interface (UI) using a remote control is a common desire among users, particularly when it comes to media devices. Tasks such as playing or pausing content, fast forwarding or rewinding content, changing channels, or adjusting volume and display settings often requires UI interaction using a remote control. However, using a remote control to change UI parameters can be challenging due to long wait times and/or multiple button presses being required for certain actions (e.g., menu actions). This often results in increased user frustration and reduced user satisfaction. In addition, this often results in decreased battery life for the remote control and increased power consumption for the UI outputting device (e.g., a media device) due to the user interacting more and over a longer period of time with the remote control (e.g., the user presses more buttons more often on the remote control).

SUMMARY

Provided herein are system, apparatus, article of manufacture, method and/or computer program product embodiments, and/or combinations and sub-combinations thereof, for controlling a user interface using motion-based control. The system, apparatus, article of manufacture, method, and/or computer program product aspects herein are designed to solve the technological problems associated with interacting with and controlling a user interface (UI) using a remote control, in particular the long wait times and/or multiple button presses often required for performing certain actions (e.g., menu actions) in the UI. In addition, the system, apparatus, article of manufacture, method, and/or computer program product aspects herein solve the additional technological problems of decreased battery life for the remote control and increased power consumption for the UI outputting device (e.g., a media device) due to the user interacting more and over a longer period of time with the remote control (e.g., the user presses more buttons more often on the remote control).

Aspects operate by a computer-implemented method for controlling a user interface using motion-based control. The method includes detecting, by at least one computer processor, a start action that triggers motion sampling from a remote control. The method further includes receiving motion data from the remote control. The method further includes determining a control context for the user interface. The method further includes changing a parameter associated with a user interface element in the user interface based on the control context and the motion data. The method further includes detecting a stop action that terminates the motion sampling from the remote control. The method further includes applying, storing, or saving the changed parameter associated with the user interface element.

Further aspects operate by a system that includes at least one processor configured to perform operations including detecting a start action that triggers motion sampling from a remote control. The operations further include receiving motion data from the remote control. The operations further include determining a control context for the user interface. Operations further include changing a parameter associated with a user interface element in the user interface based on the control context and the motion data. The operations further include detecting a stop action that terminates the motion sampling from the remote control. Operations further include applying, storing, or saving the changed parameter associated with the user interface element.

Further aspects operate by a non-transitory computer-readable medium having instructions stored thereon that, when executed by at least one computing device, cause the at least one computing device perform operations that including detecting a start action that triggers motion sampling from a remote control. The operations further include receiving motion data from the remote control. The operations further include determining a control context for the user interface. operations further include changing a parameter associated with a user interface element in the user interface based on the control context and the motion data. The operations further include detecting a stop action that terminates the motion sampling from the remote control. operations further include applying, storing, or saving the changed parameter associated with the user interface element.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for controlling a user interface using motion-based control.

Figure 1:
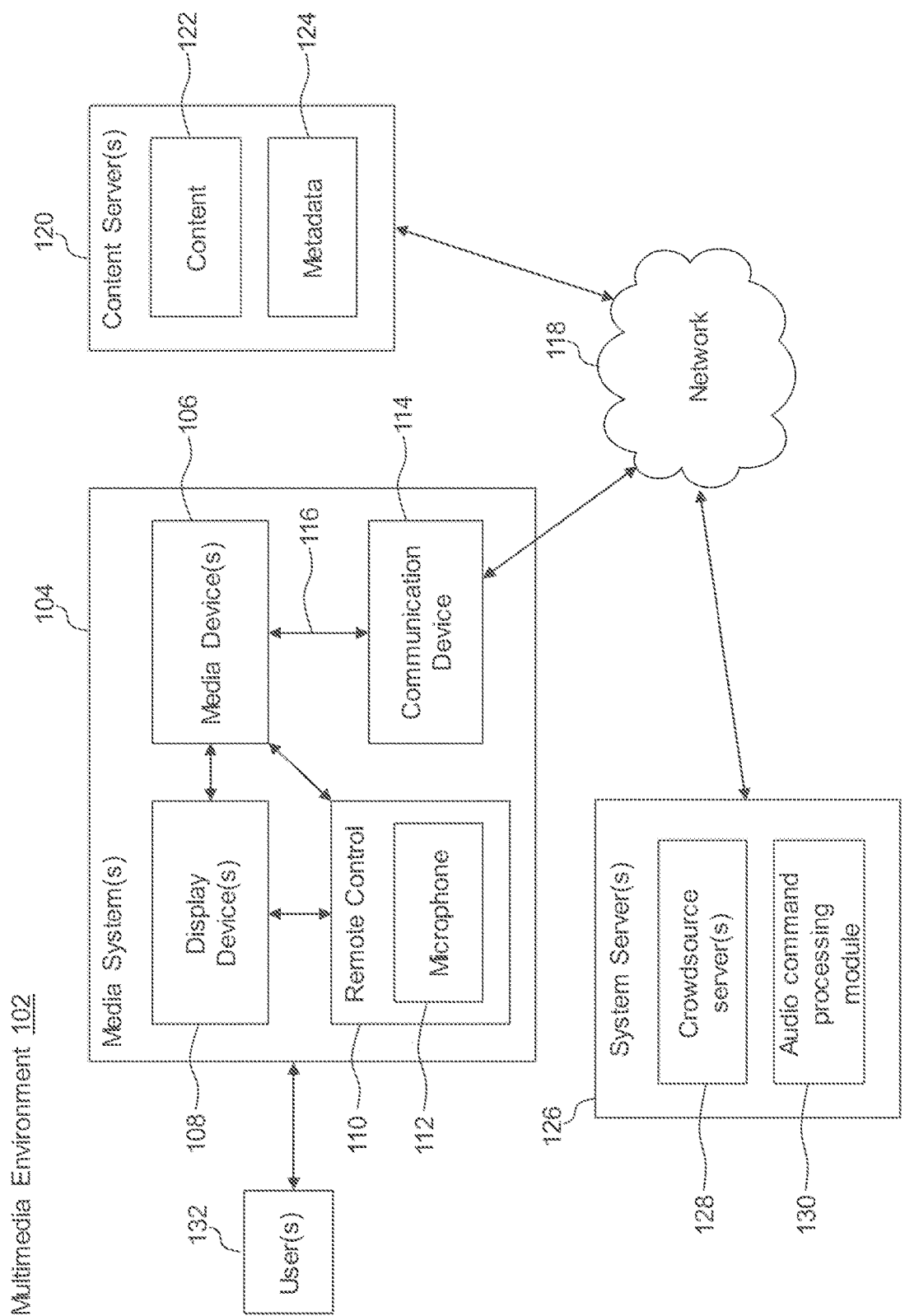
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, smartwatch, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
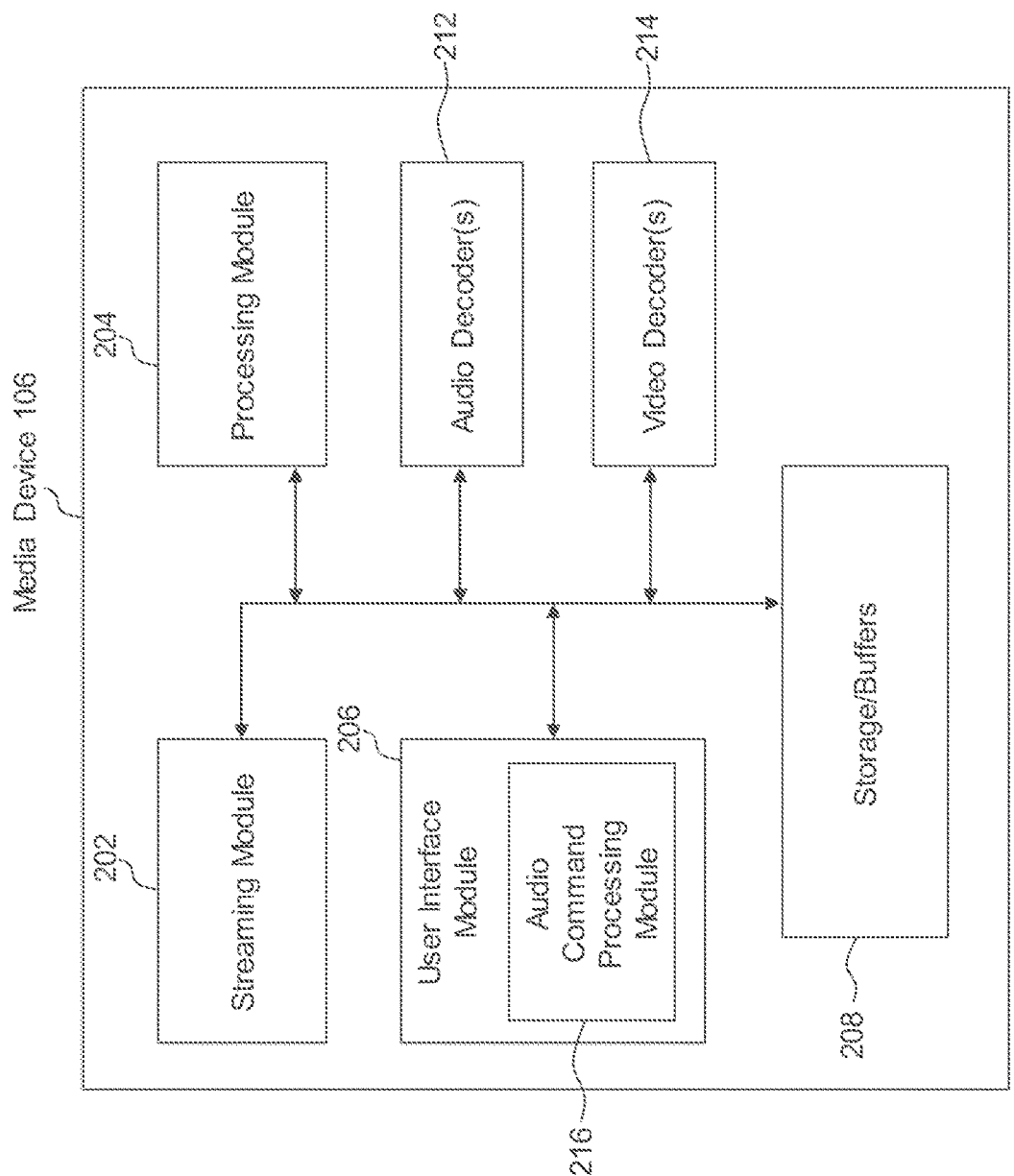
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Contextual-Based Motion of a User Interface

Referring to FIG. 1, a user 132 may control (e.g., play or pause multimedia content, fast forward or rewind multimedia content, switch to a different channel, adjust the volume or brightness of display device 108, etc.) using remote control 110. For example, the user 132 may use arrow keys on remote control 110 to change a parameter associated with a user interface element in the user interface (UI) outputted (e.g., displayed) by media device 108. The user 132 may use the arrow keys on remote control 110 to navigate a grid of tiles, where each tile represents a channel in the UI outputted by media device 108. The user 132 may also use buttons on remote control 110 to trigger the fast-forward UI element in the UI outputted by media device 108, thereby fast-forwarding the speed of playback of multimedia content.

However, it is often challenging to change a parameter associated with a UI element using a remote control because many UI actions (e.g., menu actions) require long wait times and/or multiple button presses. This can increase the amount of time it takes the user to perform an action in the UI. This can also decrease user satisfaction. In addition, this can decrease battery life in the remote control because the user interacts more and over a longer period of time with the remote control (e.g., the user presses more buttons more often on the remote control). This can also increase how much power media device 108 consumes. This is because media device 108 may process more input from the remote control.

One example where changing a parameter associated with a UI element using a remote control requires long wait times and/or multiple buttons presses is rewinding or fast-forwarding a movie, show, or program. It can often take a very long to position the seek cursor to the user's intended playback position when rewinding or fast-forwarding a program more than a few minutes. For example, it can a minute or more to move the seek cursor forward or backward a fraction of the content length.

Other examples where changing a parameter associated with a UI element using a remote control requires long wait times and/or multiple buttons presses is moving through a channel guide, the channel tiles on a home screen UI, or a textual summary of a content item. It often can take a very long for the user to move the cursor to the intended position in the channel guide or the home screen of channel tiles. Similarly, it often can take a very long time for the user to move through the entire textual summary of a content item.

To solve the above technological problems (e.g., long wait times and/or multiple button presses to change a parameter associated with a UI element, reduced battery life of the remote control, and increased power consumption by the media device), aspects herein involve changing a parameter associated with a UI element based on a control context and/or motion data received from the remote control. An aspect herein involves media device 106 detecting a start action that triggers motion sampling from remote control 110. In response to detecting the start action, media device 106 receives motion data from remote control 110. Media device 106 further determines a control context for the UI. Media device 106 then changes a parameter associated with a UI element in the UI based on the control context and/or the motion data. Media device 106 then detects a stop action that terminates the motion sampling from remote control 110. Finally, in response to detecting the stop action, media device 106 stores, saves, and/or applies the changed parameter associated with the UI element. Another aspect herein involves system server 126 detecting a start action that triggers motion sampling from remote control 110. In response to detecting the start action, system server 126 receives motion data from remote control 110. System server 126 further determines a control context for the UI. System server 126 then changes a parameter associated with a UI element in the UI based on the control context and/or the motion data. System server 126 then detects a stop action that terminates the motion sampling from remote control 110. Finally, in response to detecting the stop action, System server 126 stores, saves, and/or applies the changed parameter associated with the UI element.

In the following discussion, media device 106 is described as performing various functions associated with changing a parameter associated with a UI element based on a control context and/or motion data received from remote control 110. However, system server 126, remote control 110, and/or another electronic device as would be appreciated by a person of ordinary skill in the art may perform one or more of the functions associated with changing a parameter associated with a UI element based on a control context and/or motion data received from remote control 110.

To facilitate controlling a UI of media device 106 using motion-based control, remote control 110 may be configured to detect its motion (e.g., a change in orientation, position, location, angular velocity, rotation, etc.). For example, remote control 110 may include one or more motion sensors (e.g., a gyroscope, an accelerometer, etc.) that detect changes of motion of remote control 110. Remote control 110 may use the one or more motion sensors to obtain motion data describing the changes of motion of remote control 110. In other words, remote control 110 may be configured to do motion sampling using the one or more motion sensors.

Remote control 110 may be configured to provide the motion data to media device 106 for processing (e.g., to control the UI outputted by media device 106). For example, remote control 110 may be configured to transmit the motion data wirelessly to media device 106 for processing.

To avoid media device 106 processing errant motion data, media device 106 may be configured to detect a start action that indicates that a user 132 intended to trigger motion sampling from remote control 110. The start action may be caused by the user 132 pressing and holding a motion control button on remote control 110. The start action may be caused by the user 132 shaking remote control 110. The start action may be caused by the user 132 applying a threshold level of hand pressure to remote control 110. The start action may be caused by user 132 holding remote control 110 in a particular way. The start action may be triggered at remote control 110 using various other mechanisms as would be appreciated by a person of ordinary skill in the art.

Regardless how the start action may be triggered at remote control 110, the start action can indicate that any subsequent motion detected by remote control 110 is to be transmitted to media device 106 for processing (e.g., to control the UI outputted by media device 106). Media device 106 can then change a parameter associated with a UI element in the UI outputted by media device 106 based on the received motion data. Media device 106, however, may not save, store, or apply the changed parameter until it detects a stop action that indicates that the user 132 intended to terminate motion sampling at remote control 110. This approach can prevent media device 106 from changing a parameter associated with a UI element in the UI outputted by media device 106 based on inadvertent or unintended movements of remote control 110. In some aspects, media device 106 may also save, store, and/or apply the changed parameter without receiving a stop action that indicates that the user 132 intended to terminate motion sampling at remote control 110.

To appropriately and/or accurately process motion data received from remote control 110, media device 106 may adjust how it processes motion data from remote control 110 based on a position of remote control 110. For example, media device 106 may determine a position and/or angle of remote control 110 relative to display device 108. Media device 106 may determine the position and/or angle of remote control 110 relative display device 108 using beamforming, light detection and ranging (Lidar), Global Positioning System (GPS), or other techniques as would be appreciated by a person of ordinary skill in the art. Media device 106 may determine the position and/or angle of remote control 110 relative to display device 108 as part of a calibration process (e.g., an initial calibration process).

Similarly, to appropriately and/or accurately process motion data from remote control 110, media device 106 may adjust how it processes motion data from remote control 110 based on an identity of the user 132 operating remote control 110. Media device 106 may determine an identity of the user 132 operating remote control 110 using radar. Media device 106 may determine an identity of the user 132 operating remote control 110 using an Internet of Things (IoT) device. Media device 106 may determine an identity of the user 132 operating remote control 110 based on the media stream it is currently playing back. Media device 106 may determine an identity of the user 132 operating remote control 110 by capturing and processing an image and/or audio sample of the user 132 operating remote control 110. Media device 106 may determine an identity of the user 132 operating remote control 110 based on the currently logged in user to media device 106. Media device 106 may determine an identity of the user 132 operating remote control 110 based on the time of day. Media device 106 may determine an identity of the user 132 operating remote control 110 based on a motion gesture signature of the user 132. For example, a user 132 named John may make a 'J' motion with remote control 110, thereby identifying themself to media device 110 as the user 132 named "John." By contrast, a user 132 named Sarah may make a 'S' motion with remote control 110, thereby identifying themself to media device 110 as the user 132 named "Sarah." Media device 106 may determine an identity of the user 132 operating remote control 110 using various other techniques as would be appreciated by a person of ordinary skill in the art.

Similarly, to appropriately and/or accurately process motion data from remote control 110, media device 106 may adjust how it processes motion data from remote control 110 based on a characteristic of the user 132 operating remote control 110. A characteristic of the user 132 may include age, physical disability, handedness, or other characteristic as would be appreciated by a person of ordinary skill in the art.

Media device 106 may determine a characteristic of the user 132 operating remote control 110 using radar. Media device 106 may determine a characteristic of the user 132 operating remote control 110 using an IoT device. Media device 106 may determine a characteristic of the user 132 operating remote control 110 based on the media stream it is currently playing back. Media device 106 may determine a characteristic of the user 132 operating remote control 110 by capturing and processing an image and/or audio sample of the user 132 operating remote control 110. Media device 106 may determine a characteristic of the user 132 operating remote control 110 based on the currently logged in user to media device 106. Media device 106 may determine a characteristic of the user 132 operating remote control 110 based on the time of day. Media device 106 may determine a characteristic of the user 132 operating remote control 110 based on a motion gesture signature of the user 132. For example, a user 132 who is an adult may make a 'A' motion with remote control 110, thereby identifying themself as an adult user to media device 110. By contrast, a user 132 who is a child may make a 'C' motion with remote control 110, thereby identifying themself as a child user to media device 110. Media device 106 may determine a characteristic of the user 132 operating remote control 110 using various other techniques as would be appreciated by a person of ordinary skill in the art.

As discussed, once media device 106 detects a start action that triggers motion sampling at remote control 110, media device 106 may begin receiving motion data from remote control 110. Media device 106 can change a parameter associated with a UI element in the UI outputted by media device 106 based on the received motion data. However, media device 106 may be able to change a parameter associated with a UI element in the UI outputted by media device 106 more appropriately and/or accurately based on motion data from remote control 110 and a control context for the UI. A context control may define a state and/or circumstances of the UI. A control context may guide how the motion data from remote control 110 is to be interpreted to control the UI outputted by media device 106.

A control context may indicate what type of menu and/or screen is being output by media device 106. A control context may indicate a state of a UI element (e.g., active, inactive, ready to receive input, etc.) on the UI being output by media device 106. A control context may indicate which UI elements on the UI being output by media device 106 are capable of being manipulated through motion gestures (e.g., horizontal motion for fast forwarding), and which UI elements are not capable of being manipulated through motion gestures (e.g., a text entry box). A control context may indicate a type of gesture/motion that is acceptable for controlling a UI element on the UI being output by media device 106. For example, horizontal motion may be acceptable motion for controlling a playback timeline UI element but vertical motion may not be an acceptable motion. A control context may indicate which UI element among a plurality of UI elements it to be changed based on received motion data. In other words, a control context may define a priority order to applying the received motion data to UI elements. For example, a control context may indicate that between a playback timeline UI element and volume level UI element, the playback timeline UI element is to receive horizontal motion data first.

A control context may be defined statically or dynamically. For example, media device 106 may statically define a control context for the UI it outputs as part of its software configuration. Media device 106 may also dynamically determine a control context for the UI it outputs based machine learning (e.g., using machine learning to learn user behavior when interacting with the UI being output by media device 106). Media device 106 may perform the machine learning based on historical watch data, user data, and various other data as would be appreciated by a person of ordinary skill in the art. System server 126 may also perform the machine learning and provide the results to media device 106 to determine a control context for the UI it outputs. System server 126 may perform the machine learning by crowdsourcing data from various devices (e.g., other media devices 106).

To avoid media device 106 inadvertently changing a parameter associated with a UI element in the UI until the user 132 is ready to make the change, media device 106 may be configured to avoid saving, storing, or applying the changed parameter until it detects a stop action that indicates the user 132 intended to terminate motion sampling from remote control 110. For example, in the case of fast forwarding, media device 106 may avoid playing back multimedia content until the user 132 has positioned the seek cursor at the position they intended to fast forward to.

Media device 106 may be configured to detect a stop action that indicates that a user 132 intended to terminate motion sampling from remote control 110. The stop action may be caused by the user 132 releasing a motion control button on remote control 110. The stop action may be caused by the user 132 shaking remote control 110. The stop action may be caused by the user 132 reducing hand pressure applied remote control 110 to under a threshold level. The stop action may be caused by user 132 holding remote control 110 in a particular way. The stop action may be triggered at remote control 110 using various other mechanisms as would be appreciated by a person of ordinary skill in the art.

Regardless how the stop action may be triggered at remote control 110, the stop action can indicate that media device 106 is to save, store, or apply the changed parameter associated with the UI element in the UI outputted by media device 106. For example, media device 106 may resume playback at the changed seek cursor position. Similarly, media device 106 may save the volume setting based on the level set in the volume UI element.

To avoid media device 106 inadvertently changing a parameter associated with a UI element in the UI based on erroneously received motion data, media device 106 may be configured to detect erroneously received motion data and not process it to change a parameter associated with a UI element in the UI. For example, media device 106 may be configured to not process motion data associated with the user 132 dropping remote control 110 on the floor.

Media device 106 may be configured to detect erroneously received motion data based on the acceleration, position, orientation, and/or other motion-related data associated with remote control 110. For example, media device 106 may compare the acceleration data received from remote control 110 to one or more threshold values. If media device 106 detects that the acceleration of remote control 110 is above a threshold value, it likely means that the user 132 dropped the remote control 110 on the floor. As a result, media device 106 may not process the received motion data from the remote control 110 because it is likely the user 132 did not intend this motion to change a parameter associated with a UI element in the UI.

Media device 106 may also compare the position data received from remote control 110 to one or more threshold values. Media device 106 may also compare the orientation data received from remote control 110 to one or more threshold values. Media device 106 may compare other motion-related data associated with remote control 110 to one or more threshold values as would be appreciated by a person of ordinary skill in the art.

Based on the comparison (e.g., the motion-related data exceeding or falling short of a threshold value), media device 106 may not process the received motion data from the remote control 110 because it is likely the user 132 did not intend this motion to change a parameter associated with a UI element in the UI. To avoid media device 106 indefinitely not processing received motion data from the remote control 110 as a result of detecting erroneously received motion data, media device 106 may be configured to start processing received motion data again from the remote control 110 after a period of time (e.g., 1 minute) or another factor as would be appreciated by a person of ordinary skill in the art.

To further avoid media device 106 inadvertently changing a parameter associated with a UI element in the UI based on erroneously received motion data, media device 106 may be configured to detect a retry motion from the user 132. For example, media device 106 may be configured to not process motion data when the user 132 indicates through motion that they would like to retry their motion gesture.

Media device 106 may be configured to detect a retry motion from the user 132 based on a unique motion gesture. For example, media device 106 may detect a retry motion as the user 132 flipping remote control 110 upside down. If media device 106 detects the retry gesture, it likely means the user 132 made a mistake and would like to retry controlling the UI through their motion. As a result, media device 106 may not process the received motion data from the remote control 110 because it is likely the user 132 did not intend this motion to change a parameter associated with a UI element in the UI. To avoid media device 106 indefinitely not processing received motion data from the remote control 110 as a result of detecting a retry motion, media device 106 may be configured to start processing received motion data again from the remote control 110 after a period of time (e.g., 1 minute) or another factor as would be appreciated by a person of ordinary skill in the art.

To enable a user 132 to more easily perform common or favorite actions (or action sequences) in the UI, media device 106 may be configured to map a unique motion gesture for a user 132 to a user-selected action (or multiple user-selected actions). Media device 106 may be configured to match the received motion data from the user 132 operating the remote control 110 to a user-selected action (or multiple user-selected actions) based on the mapping(s). In response to a match, media device 106 may be configured to perform the user-selected action (or multiple user-selected actions). In other words, media device 106 may be configured to perform a user-defined macro based on the receipt of a unique motion gesture from the user 132 operating the remote control 110.

Figure 3:
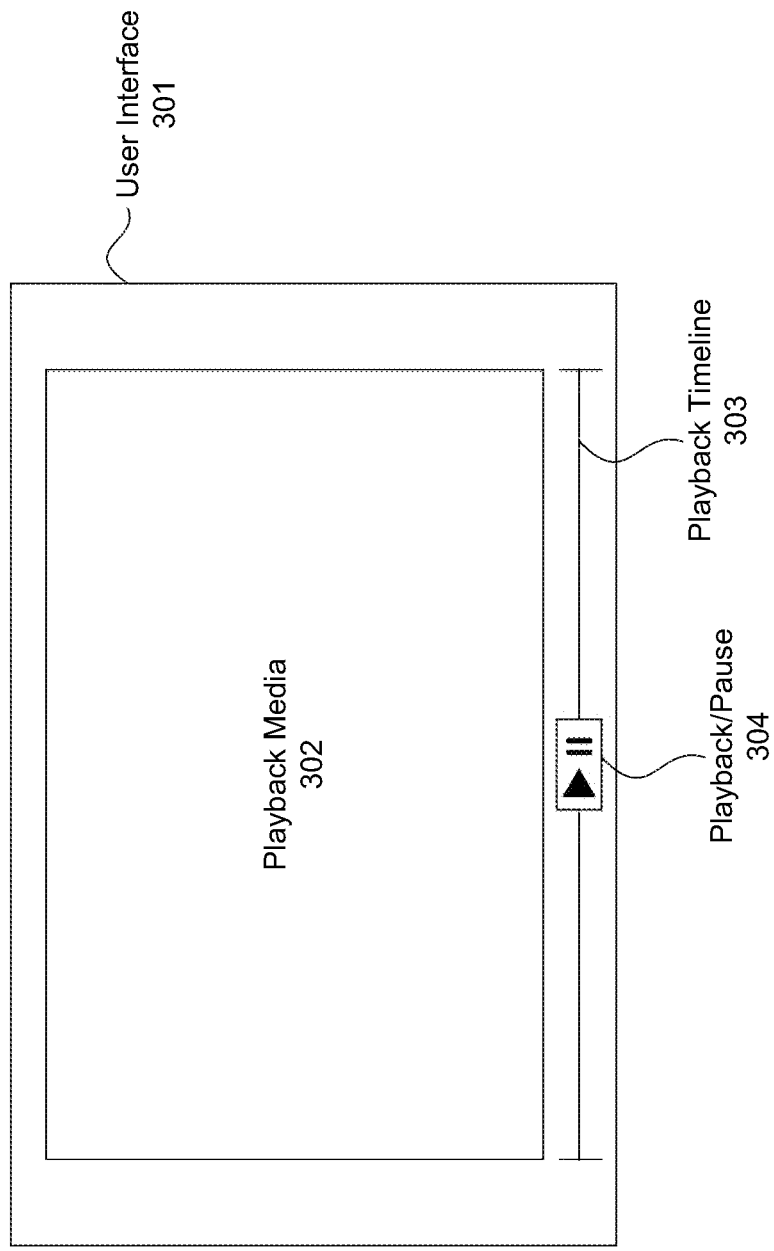
FIG. 3 illustrates an example user interface for playing back multimedia content that is capable of contextual-based motion control by a remote control, according to some embodiments.

FIG. 3 is an example user interface 301 for playing back multimedia content that is capable of contextual-based motion control by remote control 110, according to some embodiments. Media device 106 may output user interface 301. For example, media device 106 may display user interface 301 on display device 108. Media device 106 may further output playback media 302 in user interface 301. Playback media 302 may represent a movie, TV show, or other multimedia content as would be appreciated by a person of ordinary skill in the art.

User interface 301 may include various user interface elements to control the playback of playback media 302. For example, user interface 301 may include playback/pause 304 and playback timeline 303. Playback/pause 304 may be a UI element that can be used to play or pause playback media 302. Playback timeline 303 may be a UI element representing a current playback position of playback media 302. The current playback position (e.g., seek cursor) may be visually placed on the timeline of playback timeline 303.

The user 132 operating remote control 110 may want to change the current playback position of playback media 302. For example, the user 132 operating remote control 110 may want to fast forward the seek cursor to a new playback position in playback media 302. But changing the playback position (e.g., a parameter associated with playback timeline 303) using, for example, dedicated fast forward or rewind buttons on remote control 110 can require long wait times and/or multiple buttons presses to rewind or fast-forward playback media 302. For example, it can a minute or more to move the seek cursor forward or backward a fraction of the content length of playback media 302. However, the user 132 operating remote control 110 may be able to move the seek cursor to a new playback position in playback media 302 much more efficiently and/or easily using contextual-based motion control.

To begin, media device 106 can detect when the user 132 operating remote control 110 triggers a start action such as by holding a motion control button on remote control 110. Media device 106 can then determine a control context for the user interface 301. For example, media device 106 can detect that playback/pause 304 is in the paused state. In addition, media device 106 can determine that playback timeline 303 is most appropriately designed to receive horizontal motion. In view of this, when media device 106 receives horizontal motion data from the user 132 operating remote control 110, media device 106 can move the seek cursor in playback timeline 303 to a new position (e.g., left motion for rewind and right motion for fast forward). In other words, media device 106 can change a parameter (e.g., the seek cursor position) of a UI element (e.g., playback timeline 303) based on the determined control context and the received motion data from the user 132 operating remote control 110.

Figure 4:
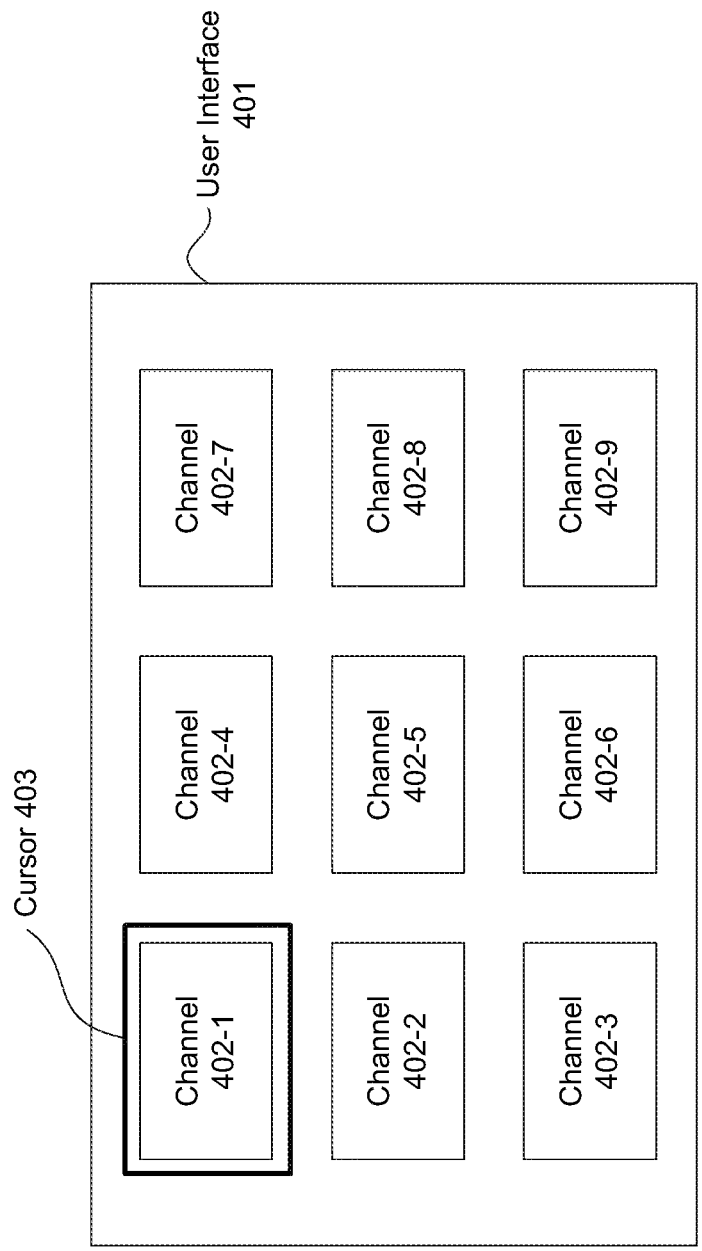
FIG. 4 illustrates an example user interface for selecting a multimedia channel for output that is capable of contextual-based motion control by a remote control, according to some embodiments.

FIG. 4 is an example user interface 401 for selecting a multimedia channel for output that is capable of contextual-based motion control by remote control 110, according to some embodiments. Media device 106 may output user interface 401. For example, media device 106 may display user interface 401 on display device 108.

User interface 401 may include a plurality of channels 402. Each channel 402 UI element may represent a multimedia channel capable of being output by media device 106 (e.g., displayed on display device 108). Cursor 403 can indicate the currently selected channel 402 that is ready to be output in response to a user confirmation (e.g., pressing the OK button on remote control 110). Cursor 403 may be overlaid on a channel 402 UI element to indicate the associated channel is currently selected. For example, in FIG. 4, cursor 403 is overlaid on channel 402-1, thereby indicating channel 402-1 is the currently selected channel ready to be output.

The user 132 operating remote control 110 may want to change the currently selected channel 402 ready to be output. But changing the currently selected channel 402 (e.g., a parameter associated with cursor 403) using, for example, dedicated up/down/left/right buttons on remote control 110 can require multiple buttons presses to move cursor 403 to the channel 402 that the user 132 wants to view. This can be especially true where there a numerous channels 402 capable of being selected by the user 132 operating remote control 110. However, the user 132 operating remote control 110 may be able to move cursor 403 to the channel 402 that the user 132 wants to view much more efficiently and/or easily using contextual-based motion control.

To begin, media device 106 can detect when the user 132 operating remote control 110 triggers a start action such as by holding a motion control button on remote control 110. Media device 106 can then determine a control context for the user interface 401. For example, media device 106 can detect user interface 401 is most appropriately designed to receive horizontal, vertical, or diagonal motion. In view of this, when media device 106 receives horizontal or vertical motion data from the user 132 operating remote control 110, media device 106 can move cursor 403 to a different channel 402 (e.g., left and right motion to move to a channel 402 in the current row, and up and down motion to move to a channel in the current column). In other words, media device 106 can change a parameter (e.g., the currently selected channel 402) associated with a UI element (e.g., cursor 403) based on the determined control context and the received motion data from the user 132 operating remote control 110.

Figure 5:
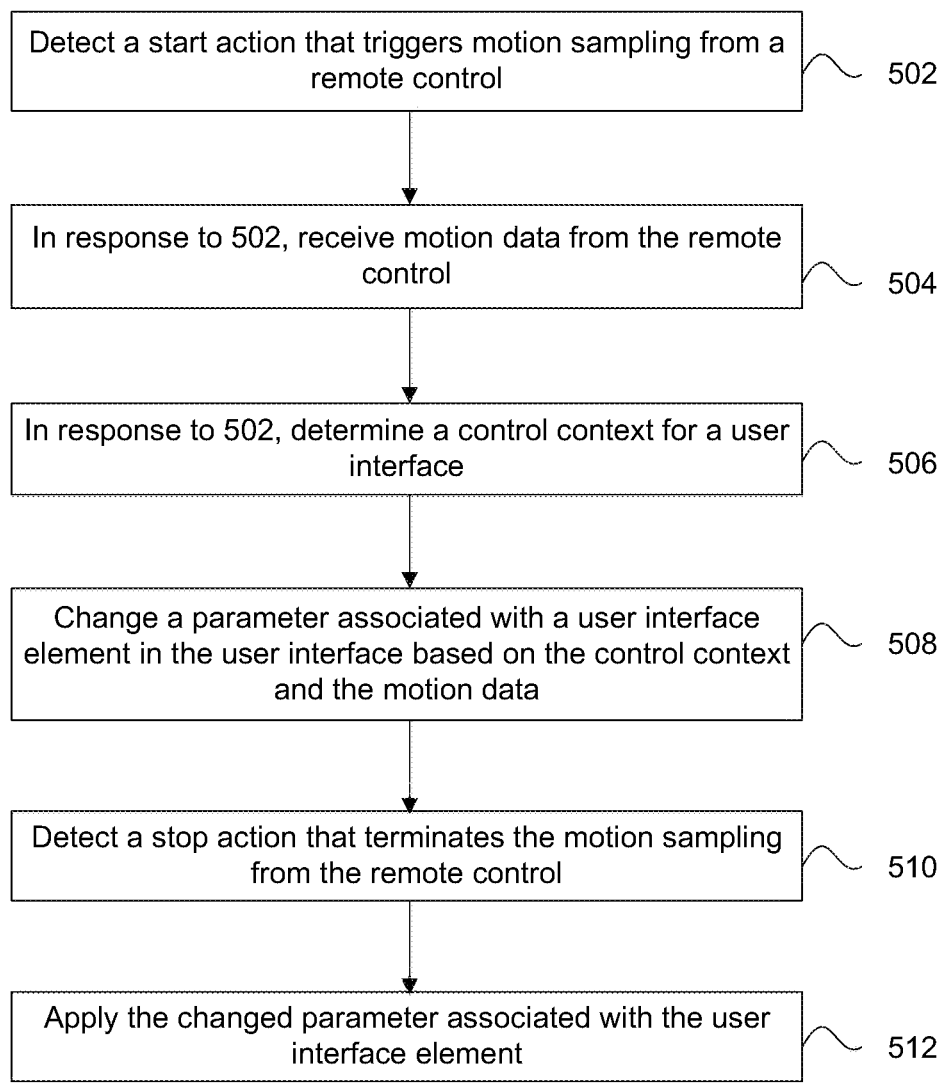
FIG. 5 is a flowchart for a process for controlling a user interface using motion-based control, according to some embodiments.

FIG. 5 is a flowchart for a method 500 for controlling a user interface using motion-based control, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. Moreover, while the steps are described as being performed by media device 106, some or all of the steps may be performed by system server 126, remote control 110, or and/or another electronic device as would be appreciated by a person of ordinary skill in the art.

Method 500 shall be described with reference to FIG. 1. However, method 500 is not limited to that example embodiment.

In step 502, media device 106 detects a start action that triggers motion sampling from remote control 110. Media device 106 may detect the start action that triggers motion sampling from remote control 110 by receiving an indication that the start action was triggered from remote control 110.

The start action may be caused by a user 132 pressing and holding a motion control button on remote control 110. The start action may be caused by the user 132 shaking remote control 110. The start action may be caused by the user 132 applying a threshold level of hand pressure to remote control 110. The start action may be caused by user 132 holding remote control 110 in a particular way. The start action may be triggered at remote control 110 using various other mechanisms as would be appreciated by a person of ordinary skill in the art.

In step 504, in response to 502, media device 106 receives motion data from remote control 110. Remote control 110 may be configured to detect the motion (e.g., a change in orientation, position, location, angular velocity, rotation, etc.). For example, remote control 110 may include one or more motion sensors (e.g., a gyroscope, an accelerometer, etc.) that detect the changes of motion of remote control 110. Remote control 110 may use the one or more motion sensors to obtain motion data describing the changes of motion of remote control 110. Remote control 110 may then transmit the obtained motion data to media device 106.

In step 506, in response to 502, media device 106 determines a control context for a UI. Media device 106 may output the UI (e.g., to display device 108).

The context control may define a state and/or circumstances of the UI. The control context may guide how the motion data from remote control 110 is to be interpreted to control the UI outputted by media device 106.

The control context may indicate what type of menu and/or screen is being output by media device 106. The control context may indicate a state of a UI element (e.g., active, inactive, ready to receive input, etc.) on the UI being output by media device 106. The control context may indicate which UI elements on the UI being output by media device 106 are capable of being manipulated through motion gestures (e.g., horizontal motion for fast forwarding), and which UI elements are not capable of being manipulated through motion gestures (e.g., a text entry box). The control context may indicate a type of gesture/motion that is acceptable for controlling a UI element on the UI being output by media device 106. For example, horizontal motion may be acceptable motion for controlling a playback timeline UI element but vertical motion may not be an acceptable motion. The control context may indicate which UI element among a plurality of UI elements it to be changed based on received motion data. In other words, a control context may define a priority order to applying the received motion data to UI elements. For example, a control context may indicate that between a playback timeline UI element and volume level UI element, the playback timeline UI element is to receive horizontal motion data first.

Media device 106 may determine the control context for the UI based on the motion data. Media device 106 may determine the control context for the UI based on a state of the UI. Media device 106 may determine the control context for the UI based on a currently selected UI element in the UI. Media device 106 may determine the control context for the UI based on the user 132 operating remote control 110. Media device 106 may determine the control context for the UI based on a type of user 132 operating remote control 110. Media device 106 may determine the control context for the UI based on a ranking of UI elements in the UI. Media device 106 may determine the control context for the UI based on time of day. Media device 106 may determine the control context for the UI using various other techniques as would be appreciated by a person of ordinary skill in the art.

Media device 106 may also dynamically determine a control context for the UI based machine learning (e.g., using machine learning to learn user behavior when interacting with the UI being output by media device 106). Media device 106 may perform the machine learning based on historical watch data, user data, and various other data as would be appreciated by a person of ordinary skill in the art. System server 126 may also perform the machine learning and provide the results to media device 106. System server 126 may perform the machine learning by crowdsourcing data from various devices (e.g., other media devices 106). Media device 106 may then determine a control context for the UI based on the results from system server 126.

In step 508, media device 106 changes a parameter associated with a UI element in the UI based on the control context for the UI and the motion data.

Media device 106 may further change the parameter associated with the UI element in the UI based on the user 132 operating remote control 110. For example, media device 106 may change the parameter associated with the UI element in the UI based on a profile of the user 132 operating remote control 110.

Media device 106 may determine an identity of the user 132 operating remote control 110 using radar. Media device 106 may determine an identity of the user 132 operating remote control 110 using an IoT device. Media device 106 may determine an identity of the user 132 operating remote control 110 based on the media stream it is currently playing back. Media device 106 may determine an identity of the user 132 operating remote control 110 by capturing and processing an image and/or audio sample of the user 132 operating remote control 110. Media device 106 may determine an identity of the user 132 operating remote control 110 based on the currently logged in user to media device 106. Media device 106 may determine an identity of the user 132 operating remote control 110 based on the time of day. Media device 106 may determine an identity of the user 132 operating remote control 110 using various other techniques as would be appreciated by a person of ordinary skill in the art.

Media device 106 may further change the parameter associated with the UI element in the UI based on a characteristic of the user 132 operating remote control 110. A characteristic of the user 132 may include age, physical disability, handedness, or other characteristic as would be appreciated by a person of ordinary skill in the art.

Media device 106 may determine the characteristic of the user 132 operating remote control 110 using radar. Media device 106 may determine the characteristic of the user 132 operating remote control 110 using an IoT device. Media device 106 may determine the characteristic of the user 132 operating remote control 110 based on the media stream it is currently playing back. Media device 106 may determine the characteristic of the user 132 operating remote control 110 by capturing and processing an image and/or audio sample of the user 132 operating remote control 110. Media device 106 may determine the characteristic of the user 132 operating remote control 110 based on the currently logged in user to media device 106. Media device 106 may determine the characteristic of the user 132 operating remote control 110 based on the time of day. Media device 106 may determine the characteristic of the user 132 operating remote control 110 using various other techniques as would be appreciated by a person of ordinary skill in the art.

Media device 106 may further change the parameter associated with the UI element in the UI based on a position of remote control 110 relative to display device 108. Media device 106 may determine the position and/or angle of remote control 110 relative display device 108 using beamforming, Lidar, GPS, or other techniques as would be appreciated by a person of ordinary skill in the art. Media device 106 may determine the position and/or angle of remote control 110 relative to display device 108 as part of a calibration process (e.g., an initial calibration process before use by the user 132).

In step 510, media device 106 optionally detects a stop action that terminates the motion sampling from remote control 110. Media device 106 may detect the stop action that terminates the motion sampling from remote control 110 by receiving an indication that the stop action was triggered from remote control 110.

The stop action may be caused by the user 132 releasing a motion control button on remote control 110. The stop action may be caused by the user 132 shaking remote control 110. The stop action may be caused by the user 132 reducing hand pressure applied remote control 110 to under a threshold level. The stop action may be caused by user 132 holding remote control 110 in a particular way. The stop action may be triggered at remote control 110 using various other mechanisms as would be appreciated by a person of ordinary skill in the art.

In step 512, media device 106 applies the changed parameter associated with the UI element. Media device 106 may also save or store the changed parameter associated with the UI element in the UI. For example, media device 106 may save the volume setting based on the changed volume level set in the volume UI element.

Media device 106 may apply the changed parameter associated with the UI element in response to detecting the stop action in step 510. Media device 106 may also apply the changed parameter associated with the UI element without receiving a stop action that indicates that the user 132 intended to terminate motion sampling at remote control 110.

Example Computer System

Figure 6:
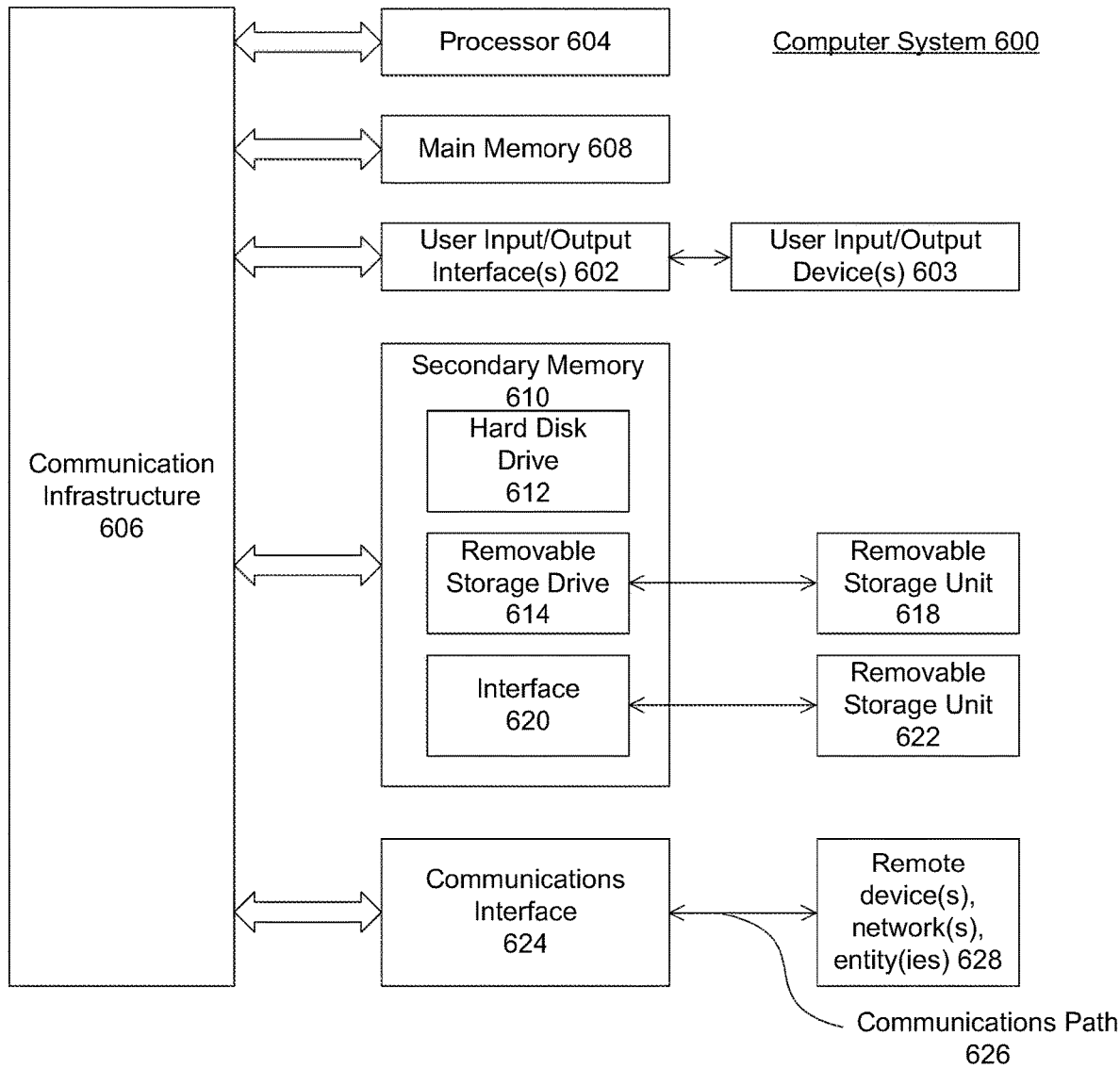
FIG. 6 illustrates an example computer system useful for implementing various embodiments.

Various embodiments may be implemented, for example, using one or more well-known computer systems, such as computer system 600 shown in FIG. 6. For example, the media device 106 may be implemented using combinations or sub-combinations of computer system 600. Also or alternatively, one or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer usable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600 or processor(s) 604), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for controlling a user interface being output by a media device using motion-based control, comprising:

detecting, by at least one computer processor, a start action that triggers motion sampling from a remote control;

in response to the detecting the start action, receiving motion data from the remote control;

in response to the detecting the start action, determining a control context for the user interface, wherein the control context defines an input state of a first user interface element being output on the user interface, indicates that the first user interface element is capable of being manipulated through motion gesture, and indicates the first user interface element is to receive a first type of the motion data from the remote control first before a second user interface element being output on the user interface;

changing a parameter associated with the first user interface element in the user interface based on the control context and the motion data;

detecting a stop action that terminates the motion sampling from the remote control; and in response to detecting the stop action, applying the changed parameter associated with the first user interface element.

2. The computer-implemented method of claim 1, wherein the detecting the start action that triggers motion sampling from the remote control comprises:

receiving an indication that the start action was triggered from the remote control.

3. The computer-implemented method of claim 1, wherein the determining the control context for the user interface comprises:

determining the control context for the user interface based on at least one of the motion data, a state of the user interface, a currently selected user interface element in the user interface, a user operating the remote control, a type of user operating the remote control, crowdsourced data, or a ranking of user interface elements in the user interface.

4. The computer-implemented method of claim 1, wherein the control context defines a type of motion for changing the parameter associated with the first user interface element.

5. The computer-implemented method of claim 1, further comprising:

identifying a user operating the remote control based on at least one of radar, an Internet of Things (IoT) device, or a media stream currently being played; and wherein the changing the parameter associated with the first user interface element comprises changing the parameter associated with the first user interface element based on a profile of the user operating the remote control or a characteristic of the user operating the remote control.

6. The computer-implemented method of claim 1, further comprising:

identifying a position of the remote control relative to a display device; and wherein the changing the parameter associated with the first user interface element comprises changing the parameter associated with the first user interface element based on the position of the remote control relative to the display device.

7. The computer-implemented method of claim 1, wherein the remote control is a tablet, laptop computer, smartphone, smartwatch, or wearable device.

8. A system for controlling a user interface using motion-based control, comprising:

one or more memories;

at least one processor each coupled to at least one of the memories and configured to perform operations comprising:

detecting a start action that triggers motion sampling from a remote control;

in response to the detecting the start action, receiving motion data from the remote control;

in response to the detecting the start action, determining a control context for the user interface, wherein the control context defines an input state of a first user interface element being output on the user interface, indicates that the first user interface element is capable of being manipulated through motion gesture, and indicates the first user interface element is to receive a first type of the motion data from the remote control first before a second user interface element being output on the user interface;

changing a parameter associated with the first user interface element in the user interface based on the control context and the motion data;

detecting a stop action that terminates the motion sampling from the remote control; and in response to detecting the stop action, applying the changed parameter associated with the first user interface element.

9. The system of claim 8, wherein the detecting the start action that triggers motion sampling from the remote control comprises:

receiving an indication that the start action was triggered from the remote control.

10. The system of claim 8, wherein the determining the control context for the user interface comprises:

determining the control context for the user interface based on at least one of the motion data, a state of the user interface, a currently selected user interface element in the user interface, a user operating the remote control, a type of user operating the remote control, crowdsourced data, or a ranking of user interface elements in the user interface.

11. The system of claim 8, wherein the control context defines a type of motion for changing the parameter associated with the first user interface element.

12. The system of claim 8, wherein the operations further comprise:

identifying a user operating the remote control based on at least one of radar, an Internet of Things (IoT) device, or a media stream currently being played; and wherein the changing the parameter associated with the first user interface element comprises changing the parameter associated with the first user interface element based on a profile of the user operating the remote control or a characteristic of the user operating the remote control.

13. The system of claim 8, wherein the operations further comprise:

identifying a position of the remote control relative to a display device; and wherein the changing the parameter associated with the first user interface element comprises changing the parameter associated with the first user interface element based on the position of the remote control relative to the display device.

14. The system of claim 8, wherein the remote control is a tablet, laptop computer, smartphone, smartwatch, or wearable device.

15. A non-transitory computer-readable medium having instructions stored thereon that, when executed by at least one computing device, cause the at least one computing device to perform operations comprising:

detecting a start action that triggers motion sampling from a remote control;

in response to the detecting the start action, receiving motion data from the remote control;

in response to the detecting the start action, determining a control context for a user interface, wherein the control context defines an input state of a first user interface element being output on the user interface, indicates that the first user interface element is capable of being manipulated through motion gesture, and indicates the first user interface element is to receive a first type of the motion data from the remote control first before a second user interface element being output on the user interface;

changing a parameter associated with the first user interface element in the user interface based on the control context and the motion data;

detecting a stop action that terminates the motion sampling from the remote control; and in response to detecting the stop action, applying the changed parameter associated with the first user interface element.

16. The non-transitory computer-readable medium of claim 15, wherein the detecting the start action that triggers motion sampling from the remote control comprises:

receiving an indication that the start action was triggered from the remote control.

17. The non-transitory computer-readable medium of claim 15, wherein the determining the control context for the user interface comprises:

determining the control context for the user interface based on at least one of the motion data, a state of the user interface, a currently selected user interface element in the user interface, a user operating the remote control, a type of user operating the remote control, crowdsourced data, or a ranking of user interface elements in the user interface.

18. The non-transitory computer-readable medium of claim 15, wherein the control context defines a type of motion for changing the parameter associated with the first user interface element.

19. The non-transitory computer-readable medium of claim 15, wherein the operations further comprise:

identifying a user operating the remote control based on at least one of radar, an Internet of Things (IoT) device, or a media stream currently being played; and wherein the changing the parameter associated with the first user interface element comprises changing the parameter associated with the first user interface element based on a profile of the user operating the remote control or a characteristic of the user operating the remote control.

20. The non-transitory computer-readable medium of claim 15, wherein the operations further comprise:

identifying a position of the remote control relative to a display device; and wherein the changing the parameter associated with the first user interface element comprises changing the parameter associated with the first user interface element based on the position of the remote control relative to the display device.

21. The computer-implemented method of claim 1, wherein the determining the control context for the user interface comprises:

determining the control context for the user interface using machine learning to learn user behavior when interacting with the user interface.

22. The computer-implemented method of claim 1, wherein the control context defines a state of a user interface element of the plurality of user interface elements in the user interface, wherein the state comprises active, inactive, or ready to receive input.

23. The computer-implemented method of claim 1, wherein the control context further indicates that the second user interface element is to receive a second type of the motion data from the remote control first, wherein the second type of the motion data from the remote control is different from the first type of the motion data from the remote control.

* * * * *